US012614759B2

(12) United States Patent
Zhao et al.

(10) Patent No.: US 12,614,759 B2
(45) Date of Patent: Apr. 28, 2026

(54) ELECTRODE ASSEMBLY, BATTERY CELL, BATTERY, AND ELECTRIC DEVICE

(71) Applicant: CONTEMPORARY AMPEREX TECHNOLOGY (HONG KONG) LIMITED, Hong Kong (CN)

(72) Inventors: Qian Zhao, Ningde (CN); Guodong Du, Ningde (CN); Qifan Zou, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 335 days.

(21) Appl. No.: 17/978,994

(22) Filed: Nov. 2, 2022

(65) Prior Publication Data

US 2024/0030495 A1 Jan. 25, 2024

Related U.S. Application Data

(63) Continuation of application No. PCT/CN2021/139225, filed on Dec. 17, 2021.

(30) Foreign Application Priority Data

Mar. 23, 2021 (CN) .......................... 202120592570.X

(51) Int. Cl.
*H01M 10/00* (2006.01)
*H01M 10/058* (2010.01)
(Continued)

(52) U.S. Cl.
CPC ....... *H01M 10/058* (2013.01); *H01M 50/531* (2021.01); *H01M 50/534* (2021.01);
(Continued)

(58) Field of Classification Search
CPC ............. H01M 10/058; H01M 50/531; H01M 50/547; H01M 2220/20; H01M 10/04;
(Continued)

(56) References Cited

U.S. PATENT DOCUMENTS

2012/0202105 A1* 8/2012 Shinyashiki ........ H01M 10/052
429/153
2018/0301684 A1* 10/2018 Tanaka ................ H01M 10/052

FOREIGN PATENT DOCUMENTS

CN 203690386 U 7/2014
CN 109585908 A 4/2019
(Continued)

OTHER PUBLICATIONS

Machine Translation of JP 2020-013733, obtained 2024 (Year: 2020).*

(Continued)

*Primary Examiner* — Nicholas P D'Aniello
(74) *Attorney, Agent, or Firm* — XSENSUS LLP

(57) ABSTRACT

This application discloses an electrode assembly, a battery cell, a battery, and an electric device. The electrode assembly may include a first electrode plate and a second electrode plate that have opposite polarities, where the first electrode plate and the second electrode plate may be stacked. The first electrode plate may include a first active substance portion and a plurality of first inactive substance portions protruding from the first active substance portion, and the plurality of first inactive substance portions may be stacked. A connection layer may be disposed between at least two adjacent first inactive substance portions, and the connection layer may be spaced from the first active substance portion in a first direction and connect two adjacent first inactive substance (Continued)

portions, where the first direction is a direction in which the first inactive substance portions protrude from the first active substance portion.

12 Claims, 7 Drawing Sheets

(51) Int. Cl.
    *H01M 50/531*    (2021.01)
    *H01M 50/534*    (2021.01)
    *H01M 50/536*    (2021.01)
    *H01M 50/54*     (2021.01)
    *H01M 50/547*    (2021.01)

(52) U.S. Cl.
    CPC ......... *H01M 50/536* (2021.01); *H01M 50/54* (2021.01); *H01M 50/547* (2021.01); *H01M 2220/20* (2013.01)

(58) Field of Classification Search
    CPC ............. H01M 50/534; H01M 50/536; H01M 50/538; H01M 50/54; H01M 4/13; H01M 4/64; Y02P 70/50; Y02E 60/10
    See application file for complete search history.

(56)                References Cited

FOREIGN PATENT DOCUMENTS

| CN | 110323403 | A  | 10/2019 |
|----|-----------|----|---------|
| CN | 111180665 | A  | 5/2020  |
| CN | 111293315 | A  | 6/2020  |
| CN | 214411248 | U  | 10/2021 |
| JP | 2005-339939 | A | 12/2005 |
| JP | 2013-505553 | A | 2/2013  |
| JP | 2014-110160 | A | 6/2014  |
| JP | 2020-013733 | A | 1/2020  |
| WO | 2018/079165 | A1 | 5/2018  |

OTHER PUBLICATIONS

Machine Translation of Toyota Industries Corp JP 2014-110160, obtained Sep. 2025 (Year: 2014).*
Notice of Reasons for Refusal issued Dec. 25, 2023 in Japanese Patent Application No. 2022-567037 and English translation thereof.
Search Report by Registered Search Organization issued Dec. 20, 2023 in Japanese Patent Application No. 2022-567037 and English translation thereof.
International Search Report and Written Opinion mailed on Mar. 4, 2022, received for PCT Application PCT/CN2021/139225, filed on Dec. 17, 2021, 9 pages including English Translation.

* cited by examiner

1

2

ELECTRODE ASSEMBLY, BATTERY CELL, BATTERY, AND ELECTRIC DEVICE

CROSS-REFERENCE TO RELATED APPLICATIONS

This application is a continuation of International Application No. PCT/CN2021/139225, filed Dec. 17, 2021, which claims priority to Chinese Patent Application No. 202120592570.X, filed on Mar. 23, 2021 and entitled "ELECTRODE ASSEMBLY, BATTERY CELL, BATTERY, AND ELECTRIC DEVICE", each of which is incorporated herein by reference in its entirety.

TECHNICAL FIELD

This application relates to the battery field, and in particular, to an electrode assembly, a battery cell, a battery, and an electric device.

BACKGROUND

Rechargeable battery cells, which may be referred to as secondary battery cells, are battery cells that can continue to be used through charging which activates active substances after discharge. Rechargeable battery cells are widely applied to electronic devices such as mobile phones, notebook computers, electric bicycles, electric vehicles, electric aircrafts, electric ships, electric car toys, electric ship toys, electric plane toys, and electric tools. Rechargeable battery cells may include nickel-cadmium battery cells, nickel-hydrogen battery cells, lithium-ion battery cells, secondary alkaline zinc-manganese battery cells, and the like.

In the development of battery technologies, in addition to improving performance of batteries, safety is also a non-negligible issue. If the safety of a battery cannot be guaranteed, the battery cannot be used. Therefore, how to improve safety performance of a battery is a technical problem that urgently needs to be resolved in battery technologies.

SUMMARY

This application provides an electrode assembly, a battery cell, a battery, and an electric device, to reduce short circuit risks and improve safety performance.

According to a first aspect, an embodiment of this application provides an electrode assembly, including a first electrode plate and a second electrode plate that have opposite polarities, where the first electrode plate and the second electrode plate are stacked. The first electrode plate includes a first active substance portion and a plurality of first inactive substance portions protruding from the first active substance portion, and the plurality of first inactive substance portions are stacked. A connection layer is disposed between at least two adjacent first inactive substance portions, and the connection layer is spaced from the first active substance portion in a first direction and is configured to connect two adjacent first inactive substance portions, where the first direction is a direction in which the first inactive substance portions protrude from the first active substance portion.

In the foregoing solution, the connection layer connects two adjacent first inactive substance portions, so as to produce a constraint between the two first inactive substance portions. In a bending process, the connection layer can reduce dislocation and bifurcation of the two first inactive substance portions, reducing short circuit risks and improving safety performance. The connection layer is spaced from the first active substance portion in the first direction, thereby reducing risks of fall-off of active substance caused by deformation of the connection layer.

In some embodiments, the first inactive substance portion includes a first region, a second region, and a third region that are consecutively disposed in the first direction, the second region is at least partially covered by the connection layer, neither of the first region and the third region is covered by the connection layer, and the second region is located on a side of the first region facing away from the first active substance portion. Optionally, the third region may be used for welding to a current collecting member.

In some embodiments, the connection layer is spaced from the first inactive substance portions along an edge in a second direction, and the second direction is perpendicular to the first direction.

In some embodiments, the connection layer is colloid and is bonded to surfaces of the first inactive substance portions. Optionally, the colloid is a hot melt adhesive.

In some embodiments, the connection layer is disposed between every two adjacent first inactive substance portions. The connection layer connects all first inactive substance portions so as to produce a constraint between the plurality of first inactive substance portions to reduce bifurcation and dislocation of the plurality of first inactive substance portions, thus reducing short circuit risks and improving safety performance.

In some embodiments, a plurality of connection layers are disposed between two adjacent first inactive substance portions, where the plurality of connection layers are spaced in a second direction, and the second direction is perpendicular to the first direction. The plurality of connection layers are respectively connected to a plurality of regions of the first inactive substance portions, to more evenly connect the two first inactive substance portions.

In some embodiments, the second electrode plate includes a second active substance portion and a plurality of second inactive substance portions protruding from the second active substance portion, and the plurality of second inactive substance portions are stacked. The electrode assembly further includes a separation member, where the separation member includes a separation portion and a protruding portion protruding from the separation portion, and the separation portion is configured to separate the first active substance portion from the second active substance portion. An end part of the protruding portion facing away from the separation portion is located between two adjacent first inactive substance portions, and the connection layer fastens the end part to the first inactive substance portions.

In the foregoing solution, the protruding portion can separate roots of the first inactive substance portions from the second electrode plate, thus reducing risks that the first inactive substance portions are conductively connected to the second electrode plate in a bending process. With the connection layer fastening the end part of the protruding portion to the first inactive substance portions, in the embodiments of this application, the protruding portion can be prevented from being folded back to between the first active substance portion and the second active substance portion, thereby guaranteeing an insulation effect of the protruding portion.

According to a second aspect, an embodiment of this application further provides a battery cell, including a housing; an electrode terminal disposed on the housing; and at least one electrode assembly according to the first aspect, accommodated in the housing, where the first inactive substance portions are electrically connected to the electrode terminal.

In some embodiments, the battery cell further includes a current collecting member, configured to connect the electrode terminal and the first inactive substance portions. A region of the first inactive substance portion that is not covered by the connection layer and that is on a side of the connection layer facing away from the first active substance portion is used for welding to the current collecting member.

In some embodiments, the first inactive substance portion is bent in a region covered by the connection layer.

According to a third aspect, an embodiment of this application further provides a battery, including: a box; and at least one battery cell according to the second aspect, where the battery cell is accommodated in the box.

According to a fourth aspect, an embodiment of this application further provides an electric device, including the battery according to the third aspect, where the battery is configured to provide electric energy.

BRIEF DESCRIPTION OF DRAWINGS

The following describes features, advantages, and technical effects of the exemplary embodiments of this application with reference to the accompanying drawings.

Figure 1:
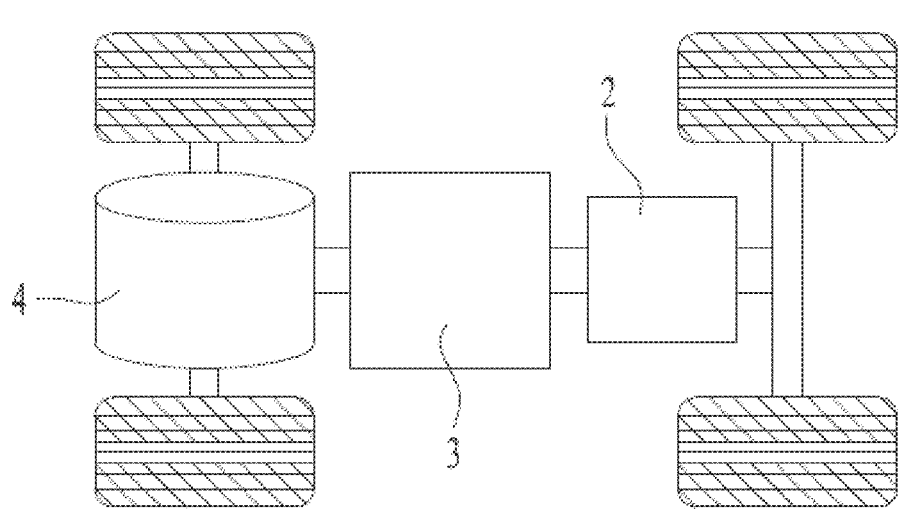
FIG. 1 is a schematic structural diagram of a vehicle according to some embodiments of this application.

In the accompanying drawings, the accompanying drawings are not necessarily drawn to scale.

DESCRIPTION OF EMBODIMENTS

To make the objectives, technical solutions, and advantages of the embodiments of this application clearer, the following clearly describes the technical solutions in the embodiments of this application with reference to the accompanying drawings in the embodiments of this application. Apparently, the described embodiments are merely part rather than all of the embodiments of this application. All other embodiments obtained by a person of ordinary skill in the art based on the embodiments of this application without creative efforts shall fall within the protection scope of this application.

Unless otherwise defined, all technical and scientific terms used in this application have a same meaning as generally understood by a person skilled in the art of this application. The terms used in the specification of this application are merely intended to describe specific embodiments, and are not intended to limit this application. In the specification, claims, and accompanying drawings of this application, the terms "include", "contain" and any other variants mean to cover a non-exclusive inclusion. In the specification, claims, or accompanying drawings of this application, the terms "first", "second", and the like are intended to distinguish between different objects but do not indicate a particular order or a primary-secondary relationship.

"Embodiment" mentioned in this application means that a particular characteristic, structure, or feature described with reference to the embodiment may be included in at least one embodiment of this application. The word appearing in various locations in the specification may not necessarily refer to a same embodiment, and is not an independent or alternative embodiment exclusive of other embodiments.

In the descriptions of this application, it should be noted that terms "mount", "join", "connect", and "attach" should be understood in their broad senses unless otherwise expressly specified and defined. For example, the terms may refer to a fixed connection, a detachable connection, or an integrated connection; or refer to a direct connection, an indirect connection via an intermediate medium, or internal communication between two elements. For persons of ordinary skill in the art, specific meanings of the foregoing terms in this application may be understood as appropriate to the specific situation.

The term "and/or" in this application describes only an association relationship for describing associated objects and represents the possible presence of three relationships. For example, A and/or B may represent presence of the following three cases: only A, both A and B, and only B. In addition, the character "/" in this application generally indicates an "or" relationship between the associated objects.

In the embodiments of this application, the same reference signs refer to the same components, and for brevity, detailed descriptions of the same components are omitted in different embodiments. It should be understood that dimensions such as thicknesses, lengths, and widths of various components and dimensions such as overall thickness, overall length, and overall width of integrated apparatuses in the embodiments of this application shown in the accompanying drawings are merely exemplary descriptions, and should not constitute any limitation on this application.

"A plurality of" in this application means more than two (including two).

In this application, a battery cell may include a lithium-ion secondary battery cell, a lithium-sulfur battery cell, a sodium-lithium-ion battery cell, a sodium-ion battery cell, a magnesium-ion battery cell, or the like. This is not limited in the embodiments of this application. The battery cell may be cylindrical, flat, cuboid, or the like. This is not limited in the embodiments of this application. Battery cells are generally classified into three types by packaging: cylindrical cells, prismatic cells, and pouch cells. This is not limited in the embodiments of this application.

A battery mentioned in the embodiments of this application is a single physical module that includes one or more battery cells to provide a higher voltage and capacity. For example, the battery mentioned in this application may include a battery module, a battery pack, or the like. The battery generally includes a box for packaging one or more battery cells. The box can prevent liquid or other foreign matter from affecting charging or discharging of the battery cell.

The battery cell includes an electrode assembly and an electrolyte, and the electrode assembly includes a positive electrode plate, a negative electrode plate, and a separation member or structure. Operating of the battery cell relies on the migration of metal ions between the positive electrode plate and the negative electrode plate. The positive electrode plate includes a positive current collector and a positive active substance layer, and the positive active substance layer is applied on a surface of the positive current collector as a coating. Taking a lithium-ion battery as an example, a material of the positive current collector may be aluminum, and the positive active substance may be lithium cobalt oxide, lithium iron phosphate, ternary lithium, lithium manganese oxide, or the like. The negative electrode plate includes a negative current collector and a negative active substance layer, and the negative active substance layer is applied on a surface of the negative current collector as a coating. A material of the negative current collector may be copper, and the negative active substance may be carbon, silicon, or the like. The separation member has a large quantity of through micropores, which can ensure free passage of electrolyte ions, friendly for lithium ions to pass. A material of the separation member may be PP (polypropylene, polypropylene), PE (polyethylene, polyethylene), or the like. In addition, the electrode assembly may be a winding structure or a laminated structure. The embodiments of this application are not limited thereto.

In the perspective of appearance of the positive electrode plate, the positive electrode plate includes a positive active substance portion and a plurality of positive inactive substance portions protruding from the positive active substance portion, and the plurality of positive inactive substance portions are stacked. The positive active substance portion is at least partially provided with a positive active substance layer, and the positive inactive substance portion is at least partially not provided with a positive active substance layer. The positive inactive substance portion may also be referred to as a positive tab.

Similarly, in the perspective of appearance of the negative electrode plate, the negative electrode plate includes a negative active substance portion and a plurality of negative inactive substance portions protruding from the negative active substance portion, and the plurality of negative inactive substance portions are stacked. The negative active substance portion is at least partially provided with a negative active substance layer, and the negative inactive substance portion is at least partially not provided with a negative active substance layer. The negative inactive substance portion may also be referred to as a negative tab.

In the battery cell, to reduce a space occupied by the positive inactive substance portions and the negative inactive substance portions, the positive inactive substance portions and the negative inactive substance portions may be bent in this application. However, the inventors have found that, when a plurality of positive inactive substance portions that are stacked are being bent, the plurality of positive inactive substance portions may be dislocated and bifurcated, which causes risks of contact between the positive inactive substance portion and the negative electrode plate, resulting in a short circuit. When a plurality of negative inactive substance portions that are stacked are being bent, the plurality of negative inactive substance portions may be dislocated and bifurcated, which causes risks of contact between the negative inactive substance portion and the positive electrode plate, resulting in a short circuit.

In view of the above, the embodiments of this application provide a technical solution. Specifically, an electrode assembly includes a first electrode plate and a second electrode plate that have opposite polarities, where the first electrode plate and the second electrode plate are stacked. The first electrode plate includes a first active substance portion and a plurality of first inactive substance portions protruding from the first active substance portion, and the plurality of first inactive substance portions are stacked. A connection layer is disposed between at least two adjacent first inactive substance portions, and the connection layer is spaced from the first active substance portion in a first direction and is configured to connect two adjacent first inactive substance portions, where the first direction is a direction in which the first inactive substance portions protrude from the first active substance portion. With this structure, the first inactive substance portions can be locally fixedly shaped and are not prone to dislocation or bifurcation, and therefore has better safety performance.

The technical solution described in the embodiments of this application is applicable to batteries and electric devices using a battery.

The electric device may be a vehicle, a mobile phone, a portable device, a notebook computer, a ship, a spacecraft, an electric toy, an electric tool, or the like. The vehicle may be a fuel vehicle, a gas vehicle, or a new energy vehicle, and the new energy vehicle may be a pure electric vehicle, a hybrid electric vehicle, an extended-range electric vehicle, or the like. The spacecraft includes a plane, a rocket, a space shuttle, a spaceship, and the like. The electric toy includes a fixed or mobile electric toy such as a game console, an electric vehicle toy, an electric ship toy, and an electric plane toy. The electric tool includes a metal cutting electric tool, a grinding electric tool, an assembling electric tool, and a railway electric tool, for example, an electric drill, an electric grinder, an electric wrench, an electric screwdriver, an electric hammer, an electric impact drill, a concrete vibrator, and an electric planer. The embodiments of this application set no special limitation on the foregoing electric device.

For ease of description, the electric device being a vehicle is used as an example in the description of the following embodiments.

Referring to FIG. 1, FIG. 1 is a schematic structural diagram of a vehicle 1 according to some embodiments of this application. A battery 2 is disposed inside the vehicle 1, and the battery 2 may be disposed at the bottom, head, or tail of the vehicle 1. The battery 2 may be configured to supply power to the vehicle 1. For example, the battery 2 may be used as an operating power source of the vehicle 1.

The vehicle 1 may further include a controller 3 and a motor 4. The controller 3 is configured to control the battery 2 to supply power to the motor 4, for example, to satisfy operating power demands of the vehicle 1 during startup, navigation and driving.

In some embodiments of this application, the battery 2 may be used not only as the operating power source of the vehicle 1, but also as a driving power source of the vehicle 1, replacing or partly replacing fuel or natural gas to provide driving power for the vehicle 1.

Figure 2:
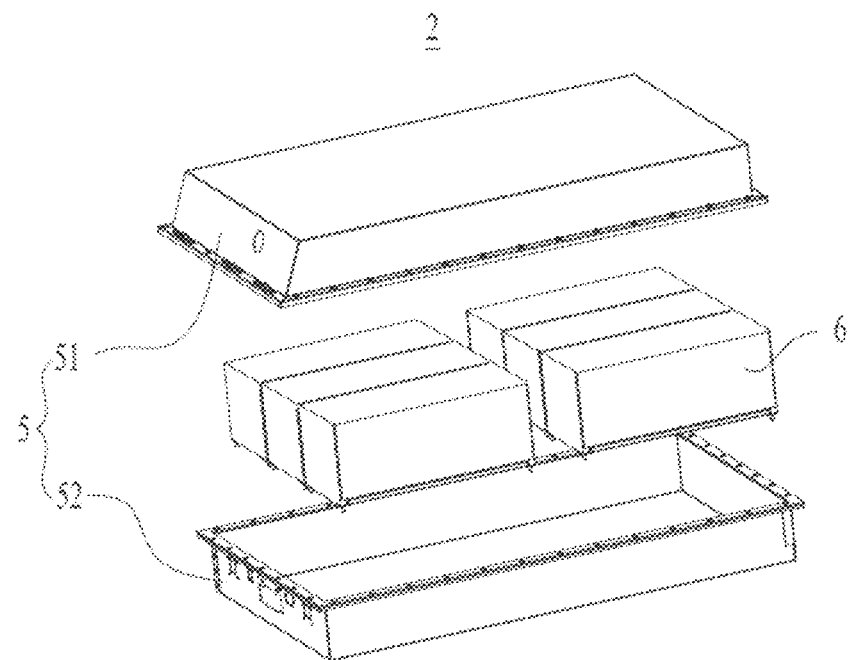
FIG. 2 is a schematic exploded view of a battery according to some embodiments of this application.

Referring to FIG. 2, FIG. 2 is a schematic exploded view of the battery 2 according to some embodiments of this application. The battery 2 includes a box 5 and a battery cell, and the battery cell is accommodated in the box 5.

The box 5 is configured to accommodate the battery cell, and the box 5 may have various structures. In some embodiments, the box 5 may include a first box portion 51 and a second box portion 52, the first box portion 51 and the second box portion 52 are mutually engaged, and the first box portion 51 and the second box portion 52 jointly define an accommodation space 53 for accommodating the battery cell. The second box portion 52 may be a hollow structure with an opening at one end and the first box portion 51 is a plate-like structure, where the first box portion 51 covers the opening side of the second box portion 52 to form the box 5 with the accommodation space 53. Alternatively, the first box portion 51 and the second box portion 52 may both be hollow structures with an opening on one side, where the opening side of the first box portion 51 is engaged with the opening side of the second box portion 52 to form the box 5 with the accommodation space 53. Certainly, the first box portion 51 and the second box portion 52 may have various shapes, for example, being cylindrical or cuboid.

To improve airtightness after the first box portion 51 is joined to the second box portion 52, a sealing member such as a sealing adhesive or a sealing ring may be disposed between the first box portion 51 and the second box portion 52.

Assuming that the first box portion 51 covers the top of the second box portion 52, the first box portion 51 may also be referred to as an upper box cover, and the second box portion 52 may also be referred to as a lower box body.

In the battery 2, there may be one or more battery cells. If there are a plurality of battery cells, the plurality of battery cells may be connected in series or in parallel or in parallel and series. A parallel-series connection means a combination of series connection and parallel connection of the plurality of battery cells. The plurality of battery cells may be directly connected in series or in parallel or in parallel and series, and then a whole composed of the plurality of battery cells is accommodated in the box 5. Certainly, alternatively, a plurality of battery cells may first be connected in series or in parallel or in parallel and series to form a battery module 6, and then a plurality of battery modules 6 are connected in series or in parallel or in parallel and series to form a whole which is accommodated in the box 5.

Figure 3:
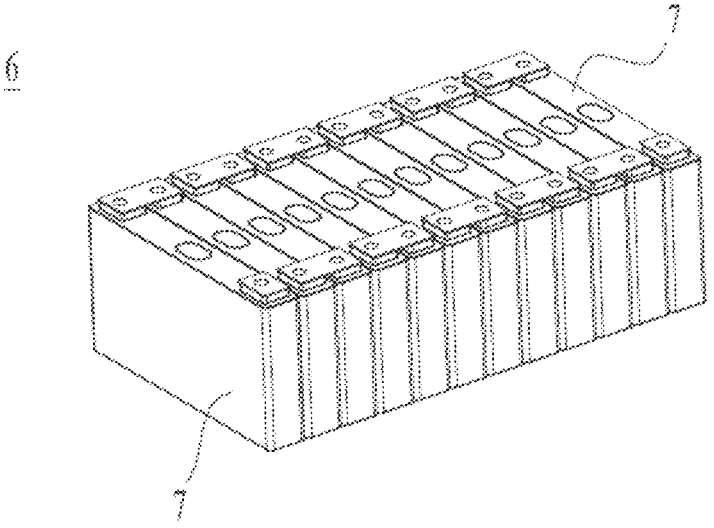
FIG. 3 is a schematic structural diagram of a battery module shown in FIG. 2.

In some embodiments, referring to FIG. 3, FIG. 3 is a schematic structural diagram of the battery module 6 shown in FIG. 2. There are a plurality of battery cells 7, and the plurality of battery cells 7 are first connected in series or in parallel or in parallel and series to form a battery module 6. A plurality of battery modules 6 are connected in series or in parallel or in parallel and series to form a whole which is accommodated in the box.

The plurality of battery cells 7 in the battery module 6 may be electrically connected to each other by using a bus component, to implement a parallel or series connection or parallel-series connection between the plurality of battery cells 7 in the battery module 6.

Figure 4:
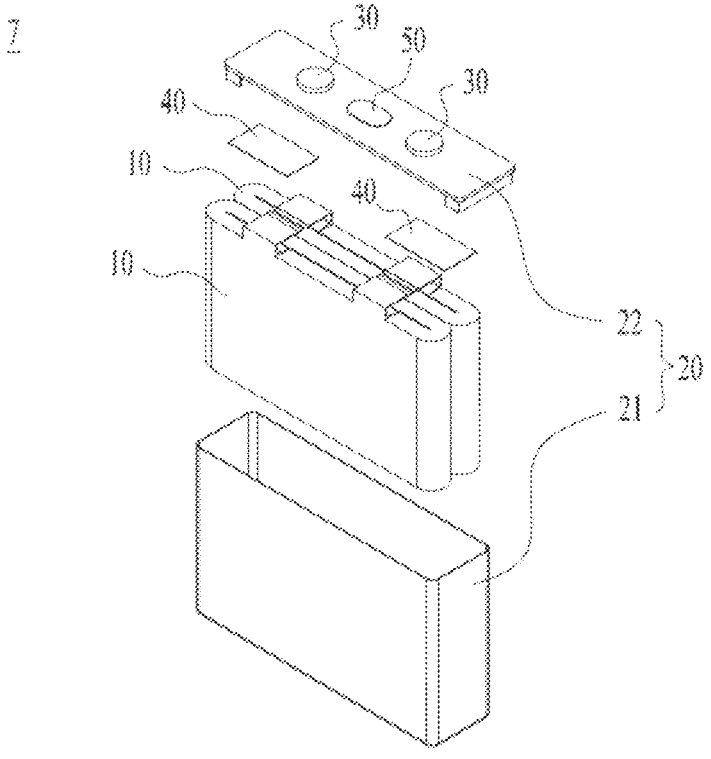
FIG. 4 is a schematic exploded view of a battery cell shown in FIG. 3.

Referring to FIG. 4, FIG. 4 is a schematic exploded view of the battery cell 7 shown in FIG. 3. The battery cell 7 provided in the embodiments of this application includes an electrode assembly 10 and a housing 20, and the electrode assembly 10 is accommodated in the housing 20.

In some embodiments, the housing 20 may be further configured to accommodate an electrolyte, for example, a liquid electrolyte. The housing 20 may have various structures.

In some embodiments, the housing 20 may include a shell 21 and an end cover 22. The shell 21 is a hollow structure with an opening on one side, and the end cover 22 is covered on the opening of the shell 21 to form a sealing connection, to constitute a sealing space for accommodating the electrode assembly 10 and the electrolyte.

The shell 21 may have various shapes, for example, being cylindrical or cuboid. The shape of the shell 21 may depend on a specific shape of the electrode assembly 10. For example, if the electrode assembly 10 is a cylindrical structure, a cylindrical shell may be used. If the electrode assembly 10 is a cuboid structure, a cuboid shell may be used. Certainly, the end cover 22 may also have various structures. For example, the end cover 22 is a plate-like structure or a hollow structure with an opening at one end. For example, in FIG. 4, the shell 21 is a cuboid structure, the end cover 22 is a plate-like structure, and the end cover 22 covers the opening at the top of the shell 21.

In some embodiments, the battery cell 7 further includes two electrode terminals 30, and the two electrode terminals 30 are mounted on the end cover 22. The two electrode terminals 30 are respectively a positive electrode terminal and a negative electrode terminal, and both the positive electrode terminal and the negative electrode terminal are configured to be electrically connected to the electrode assembly 10, to output electric energy generated by the electrode assembly 10.

In some embodiments, the battery cell 7 further includes a current collecting member or structure 40, configured to connect the electrode terminal 30 and the electrode assembly 10. For example, there are two current collecting members 40. One current collecting member 40 is configured to connect the positive electrode terminal and the positive electrode plate of the electrode assembly 10, and the other current collecting member 40 is configured to connect the negative electrode terminal and the negative electrode plate of the electrode assembly 10.

In some embodiments, the battery cell 7 further includes a pressure relief mechanism 50 mounted on the end cover 22, and the pressure relief mechanism 50 is configured to relieve pressure inside the battery cell 7 when internal pressure or temperature of the battery cell 7 reaches a predetermined value. For example, the pressure relief mechanism 50 is located between the positive electrode terminal and the negative electrode terminal, and the pressure relief mechanism 50 may be a component such as an explosion-proof valve, an explosion-proof plate, an air valve, a pressure relief valve, or a safety valve.

Certainly, in some embodiments, the housing 20 may have another structure. For example, the housing 20 includes a shell 21 and two end covers 22. The shell 21 is a hollow structure with opposite openings on two sides. One end cover 22 correspondingly covers one opening of the shell 21 to form a sealed connection, so as to produce a sealed space for accommodating the electrode assembly 10 and the electrolyte. In this structure, the positive electrode terminal and the negative electrode terminal may be mounted on one or different end covers 22; and one or both end covers 22 may be provided with a pressure relief mechanism 50 mounted.

It should be noted that in the battery cell 7, there may be one or more electrode assemblies 10 accommodated in the housing 20. For example, in FIG. 4, there are two electrode assemblies 10.

A specific structure of the electrode assembly 10 is described in detail below with reference to the accompanying drawings.

Figure 5:
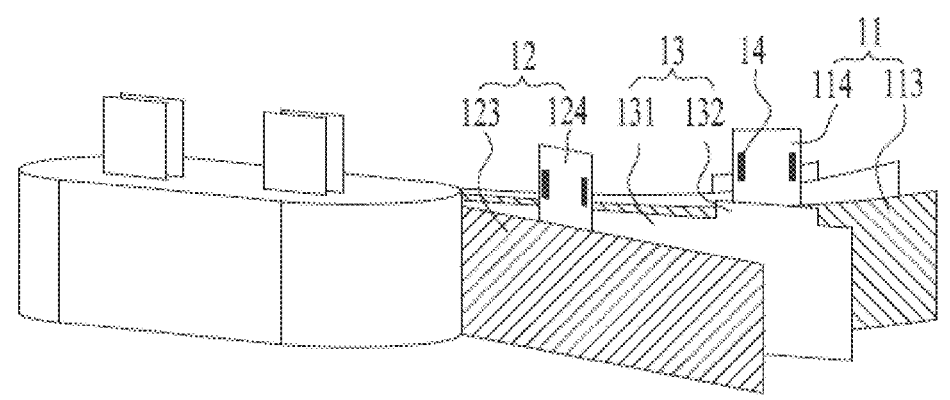
FIG. 5 is a schematic structural diagram of an electrode assembly according to some embodiments of this application.
Figure 6:
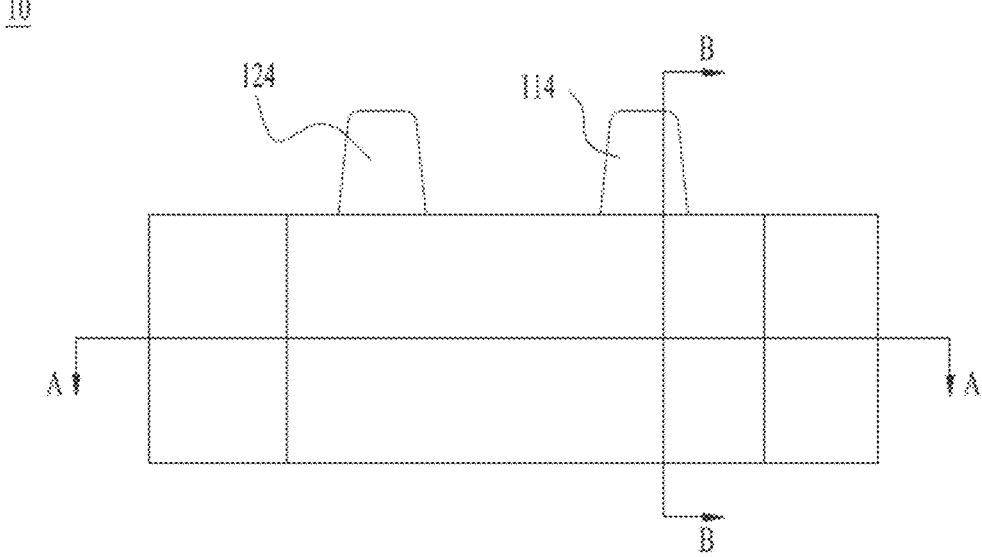
FIG. 6 is a front view of an electrode assembly according to a specific embodiment of this application.
Figure 7:
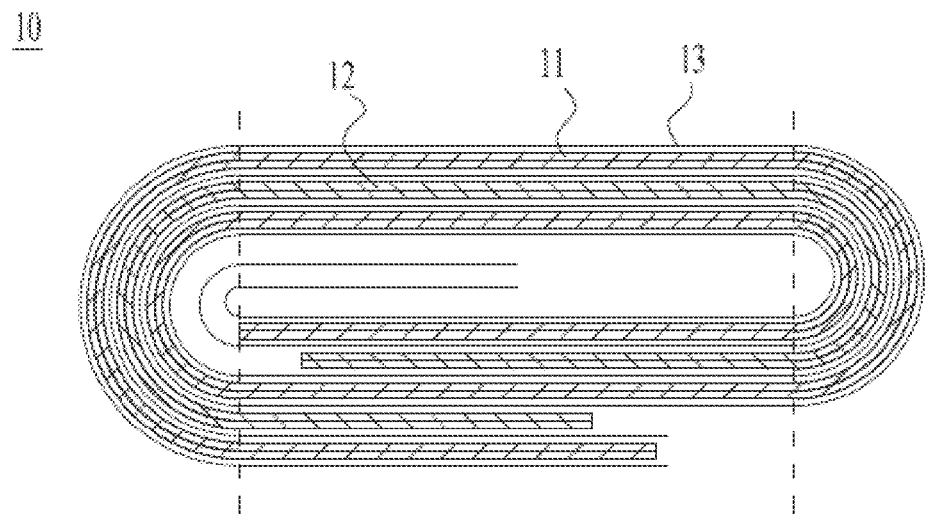
FIG. 7 is a schematic cross-sectional view of the electrode assembly shown in FIG. 6 along a line A-A.
Figure 8:
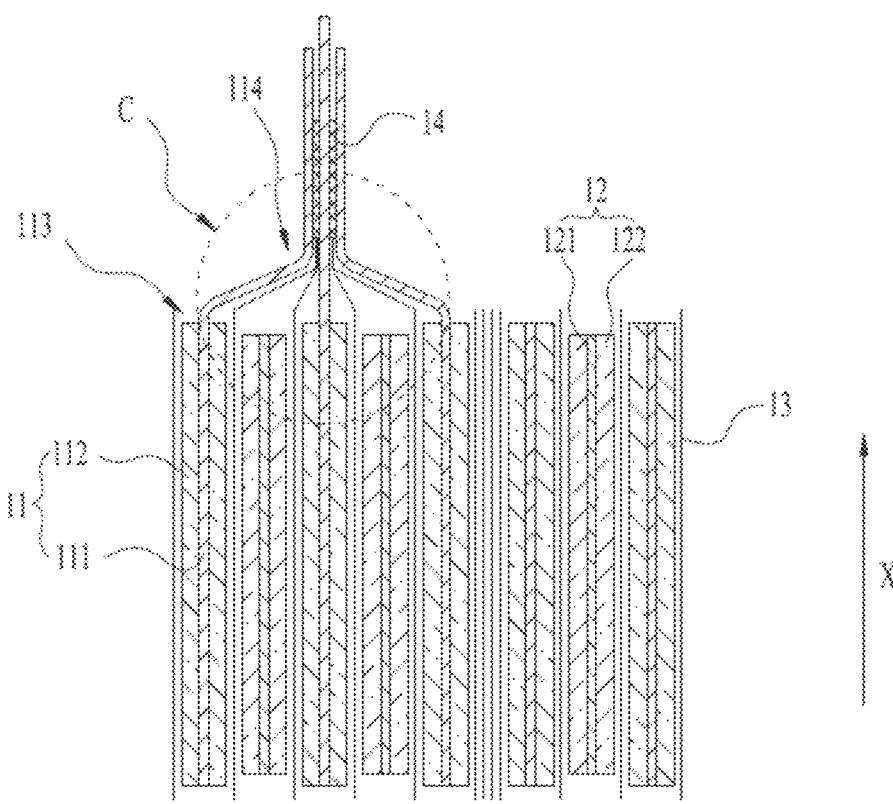
FIG. 8 is a schematic cross-sectional view of the electrode assembly shown in FIG. 6 along a line B-B.

FIG. 5 is a schematic structural diagram of an electrode assembly according to some embodiments of this application. FIG. 6 is a front view of the electrode assembly according to a specific embodiment of this application. FIG. 7 is a schematic cross-sectional view of the electrode assembly shown in FIG. 6 along a line A-A. FIG. 8 is a schematic cross-sectional view of the electrode assembly shown in FIG. 6 along a line B-B. The electrode assembly shown in FIG. 5 is partially expanded.

As shown in FIG. 5 to FIG. 8, the electrode assembly 10 in the embodiments of this application includes a first electrode plate 11 and a second electrode plate 12 that have opposite polarities, and the first electrode plate 11 and the second electrode plate 12 are stacked. In some embodiments, the first electrode plate 11 is a positive electrode plate, and the second electrode plate 12 is a negative electrode plate. In other embodiments, the first electrode plate 11 is a negative electrode plate, and the second electrode plate 12 is a positive electrode plate.

In some embodiments, the electrode assembly 10 further includes a separation member 13, and the separation member 13 is configured to separate the first electrode plate 11 from the second electrode plate 12. For example, the separation member 13 is disposed between the first electrode plate 11 and the second electrode plate 12.

In some embodiments, the electrode assembly 10 is a winding structure. The first electrode plate 11, the separation member 13, and the second electrode plate 12 are all strip-like structures. The first electrode plate 11, the separation member 13, and the second electrode plate 12 are sequentially stacked and the resulting stack is wound for above two turns to form the electrode assembly 10, and the electrode assembly 10 is flat. When the electrode assembly 10 is being fabricated, the electrode assembly 10 may be directly wound into a flat shape, or may be first wound into a hollow cylindrical structure which is then pressed into a flat shape.

In some other embodiments, the electrode assembly 10 is a laminated structure. The electrode assembly 10 includes a plurality of first electrode plates 11 and a plurality of second electrode plates 12. The first electrode plates 11 and the second electrode plates 12 are alternately stacked, a stacking direction being parallel to a thickness direction of the first electrode plates 11 and a thickness direction of the second electrode plates 12.

The first electrode plate 11 includes a first current collector 111 and a first active substance layer 112 applied on a surface of the first current collector 111. The first current collector 111 includes a first current collecting portion and a first conductive portion extending from an end part of the first current collecting portion, and the first conductive portion protrudes from the first current collecting portion. At least part of the first current collecting portion is applied with the first active substance layer 112, and at least part of the first conductive portion is not applied with the first active substance layer 112. A region of the first conductive portion that is not applied with the first active substance layer 112 is used for electrical connection to an electrode terminal.

In the perspective of appearance of the first electrode plate 11, the first electrode plate 11 includes a first active substance portion 113 and a plurality of first inactive substance portions 114 protruding from the first active substance portion 113, and the plurality of first inactive substance portions 114 are stacked. The first active substance portion 113 includes a first current collecting portion and a part of the first active substance layer 112 that is applied on the first current collecting portion, and the first inactive substance portion 114 includes a first conductive portion. The first inactive substance portion 114 may also be referred to as a first tab.

The second electrode plate 12 includes a second current collector 121 and a second active substance layer 122 applied on a surface of the second current collector 121. The second current collector 121 includes a second current collecting portion and a second conductive portion extending from an end part of the second current collecting portion, and the second conductive portion protrudes from the second current collecting portion. At least part of the second current collecting portion is applied with the second active substance layer 122, and at least part of the second conductive portion is not applied with the second active substance layer 122. A region of the second conductive portion that is not applied with the second active substance layer 122 is used for electrical connection to an electrode terminal.

In the perspective of appearance of the second electrode plate 12, the second electrode plate 12 includes a second active substance portion 123 and a plurality of second inactive substance portions 124 protruding from the second active substance portion 123, and the plurality of second inactive substance portions 124 are stacked. The second active substance portion 123 includes a second current collecting portion and a part of the second active substance layer 122 that is applied on the second current collecting portion, and the second inactive substance portion 124 includes a second conductive portion. The second inactive substance portion 124 may also be referred to as a second tab.

In some embodiments, the plurality of first inactive substance portions 114 are stacked and connected to the current collecting member 40. For example, the plurality of first inactive substance portions 114 are welded to the current collecting member 40.

To reduce a space occupied by the first inactive substance portions 114, the inventors bend the plurality of first inactive substance portions 114 that are stacked. The inventors have found that a small constraint is present between the plurality of first inactive substance portions 114, and that in a bending process, the plurality of first inactive substance portions 114 that are stacked are apt to be bifurcated and dislocated, and roots of the first inactive substance portions 114 (which are parts thereof close to the first active substance portion 113) are apt to deform and insert between the first active substance portion 113 and the second active substance portion 123, which causes risks of contact between the first inactive substance portion 114 and the second active substance portion 123, resulting in a short circuit and leading to safety incidents.

Based on the foregoing problem discovered by the inventors, the inventors have improved the structure of the battery cell, which is described below in detail with reference to different embodiments.

Figure 9:
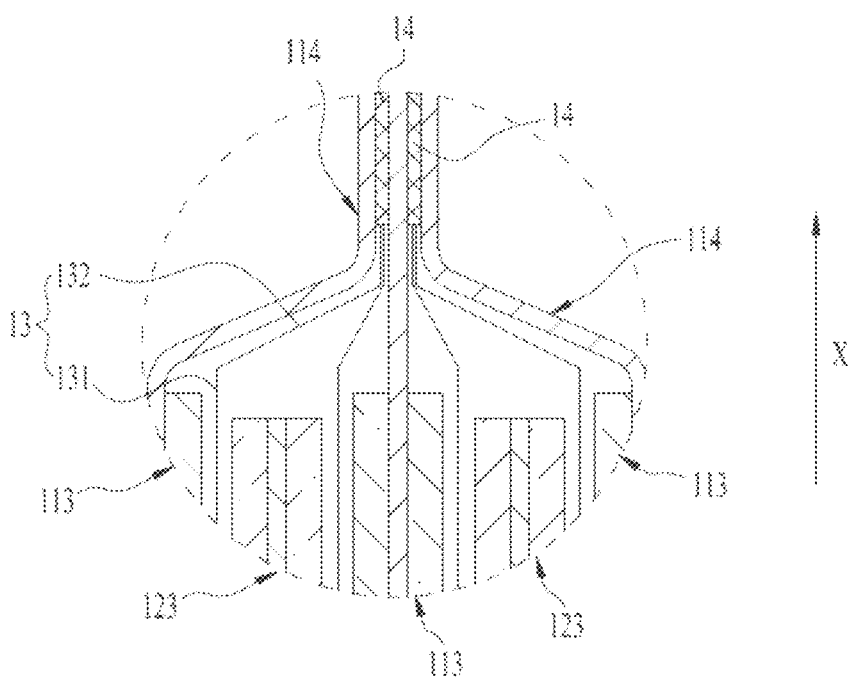
FIG. 9 is a schematic enlarged view of the electrode assembly shown in FIG. 8 at a circular frame C.

FIG. 9 is a schematic enlarged view of the electrode assembly 10 shown in FIG. 8 at a circular frame C.

As shown in FIG. 9, in some embodiments, a connection layer 14 is disposed between at least two adjacent first inactive substance portions 114, and the connection layer 14 is configured to connect two adjacent first inactive substance portions 114.

In an embodiment of this application, the connection layer 14 connects two adjacent first inactive substance portions 114 to produce a constraint between the two first inactive substance portions 114. In a bending process, the connection layer 14 can reduce dislocation of the two first inactive substance portions 114, and reduce risks that the plurality of first inactive substance portions 114 that are stacked are bifurcated between the two first inactive substance portions 114. In other words, by disposing the connection layer 14 in this application, a constraint can be produced between the two first inactive substance portions 114 to fixedly shape the plurality of first inactive substance portions 114, so as to reduce bifurcation and dislocation of the first inactive substance portion 114, thus reducing short circuit risks and improving safety performance.

In some embodiments, the connection layer 14 is spaced from the first active substance portion 113 in a first direction X, where the first direction X is a direction in which the first inactive substance portions 114 protrude from the first active substance portion 113. For example, the first inactive substance portions 114 are connected to an end part of the first active substance portion 113 in the first direction X. For example, the connection layer 14 is spaced from the first active substance layer 112 in the first direction X.

In a process of bending the first inactive substance portions 114, the connection layer 14 may also deform with the bending of the first inactive substance portions 114. If the connection layer 14 is connected to the first active substance portion 113, the connection layer 14 exerts an action force on the first active substance portion 113 during deformation (when the battery cell vibrates, the connection layer 14 also exerts an action force on the first active substance portion 113), causing risks of fall-off of active substance from the first active substance portion 113.

In the embodiments of this application, the connection layer 14 is spaced from the first active substance portion 113 in the first direction, thereby reducing risks of fall-off of active substance caused by deformation of the connection layer 14.

If the connection layer 14 extends to a surface of the first active substance portion 113 facing the second active substance portion 123, the connection layer 14 blocks transmission of lithium ions between the first active substance portion 113 and the second active substance portion 123, thereby affecting charging and discharging performance of the electrode assembly 10. In the embodiments of this application, the connection layer 14 is spaced from the first active substance portion 113, thereby preventing the connection layer 14 from affecting transmission of lithium ions.

In some embodiments, the connection layer 14 is colloid and is bonded to surfaces of the first inactive substance portions 114. For example, the colloid is a hot melt adhesive. The hot melt adhesive is a mixture formed by melting a thermoplastic elastomer as a main component with a thickener, a plasticizer, an antioxidant, a flame retardant, and a filler as additives. Optionally, the thermoplastic elastomer includes one or more of PE-polyethylene, polyvinyl chloride, polystyrene, polyamide, polyformaldehyde, polycarbonate, polyphenylene ether, polysulfone, rubber, and the like.

In some embodiments, the connection layer 14 is disposed between every two adjacent first inactive substance portions 114. The connection layer 14 connects all first inactive substance portions 114 to produce a constraint between the plurality of first inactive substance portions 114, so as to reduce bifurcation and dislocation of the plurality of first inactive substance portions 114, thus reducing short circuit risks and improving safety performance.

During winding and shaping of the electrode assembly 10, a hot melt adhesive is applied on a specified surface of the first inactive substance portions 114. After winding and shaping, the plurality of first inactive substance portions 114 are stacked, and then the plurality of first inactive substance portions 114 are pressed so that the hot melt adhesive binds the plurality of first inactive substance portions 114 together. The connection layer 14 is formed after the hot melt adhesive is cured.

In some embodiments, the separation member 13 includes a separation portion 131 and a protruding portion 132 protruding from the separation portion 131, and the separation portion 131 is configured to separate the first active substance portion 113 from the second active substance portion 123. An end part of the protruding portion 132 facing away from the separation portion 131 is located between two adjacent first inactive substance portions 114, and the connection layer 14 fastens the end part to the first inactive substance portions 114.

The protruding portion 132 can separate roots of the first inactive substance portions 114 from the second electrode plate 12, reducing risks that the first inactive substance portions 114 are conductively connected to the second electrode plate 12 in a bending process. With the connection layer 14 fastening the end part of the protruding portion 132 to the first inactive substance portions 114, in the embodiments of this application, the protruding portion 132 can be prevented from being folded back to between the first active substance portion 113 and the second active substance portion 123, guaranteeing an insulation effect of the protruding portion 132.

In some embodiments, a thickness of the connection layer 14 is less than a thickness of the first active substance layer 112. For example, a ratio of the thickness of the connection layer 14 to the thickness of the first active substance layer 112 is 0.1-0.5.

In some embodiments, the connection layer 14 is also disposed between at least two adjacent second inactive substance portions 124, and the connection layer 14 is configured to connect two adjacent second inactive substance portions 124. In some embodiments, the connection layer 14 is disposed between every two adjacent second inactive substance portions 124.

Figure 10:
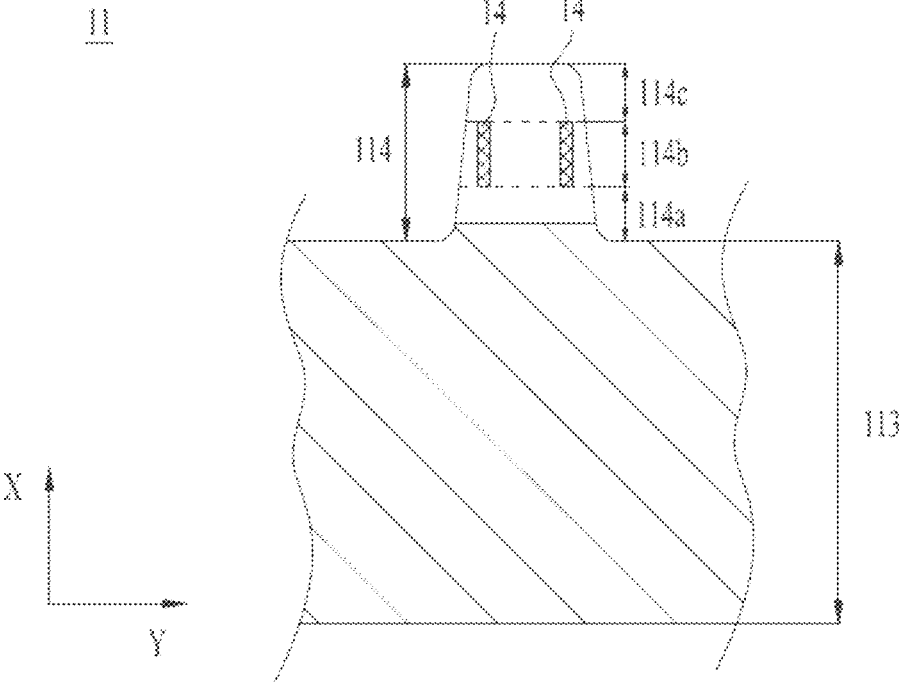
FIG. 10 is a schematic diagram of a partial structure of a first electrode plate of an electrode assembly in an expanded state according to some embodiments of this application.

FIG. 10 is a schematic diagram of a partial structure of the first electrode plate 11 of the electrode assembly 10 in an expanded state according to some embodiments of this application.

As shown in FIG. 10, in some embodiments, the first inactive substance portion 114 includes a first region 114*a*, a second region 114*b*, and a third region 114*c* that are consecutively disposed in the first direction X, the second region 114*b* is at least partially covered by the connection layer 14, neither of the first region 114*a* and the third region 114*c* is covered by the connection layer 14, and the second region 114*b* is located on a side of the first region 114*a* facing away from the first active substance portion 113. For example, the third region 114*c* may be used for welding to the current collecting member 40.

A surface of the second region 114*b* may be completely covered by the connection layer 14 or only partially covered by the connection layer 14.

In some embodiments, the first region 114*a* is partially provided with the first active substance layer 112, and the connection layer 14 is spaced from the first active substance layer 112. In some other embodiments, the first region 114a may not be provided with the first active substance layer 112.

In some embodiments, the connection layer 14 is spaced from the first inactive substance portions along an edge 114 in a second direction Y, and the second direction Y is perpendicular to the first direction X. During winding and shaping, because of process error, the plurality of first inactive substance portions 114 may be dislocated in the second direction Y. If the connection layer 14 is flush with the first inactive substance portions 114 along the edge in the second direction Y, the connection layer 14 may fail to connect the two adjacent first inactive substance portions 114 because of the dislocation in the second direction Y. Therefore, in the embodiments, the connection layer 14 is spaced from the first inactive substance portions 114 along the edge in the second direction Y, to effectively connect two adjacent first inactive substance portions 114. For example, a spacing between the connection layer 14 and the first inactive substance portions 114 along the edge in the second direction Y is 5 mm-20 mm.

In some embodiments, a plurality of connection layers 14 are disposed between two adjacent first inactive substance portions 114, and the plurality of connection layers 14 are spaced in the second direction Y. The plurality of connection layers 14 are respectively connected to a plurality of regions of the first inactive substance portions 114, to more evenly connect the two first inactive substance portions 114. For example, two connection layers 14 are disposed between two adjacent first inactive substance portions 114.

In some embodiments, the connection layer 14 is a strip structure, and a size of the connection layer 14 in the first direction X is greater than a size of the connection layer 14 in the second direction Y.

Figure 11:
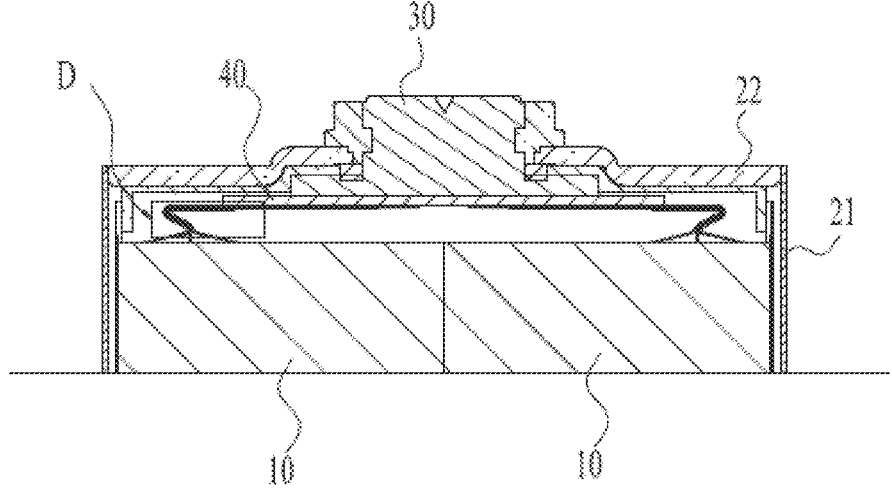
FIG. 11 is a partial schematic cross-sectional view of a battery cell according to some embodiments of this application.
Figure 12:
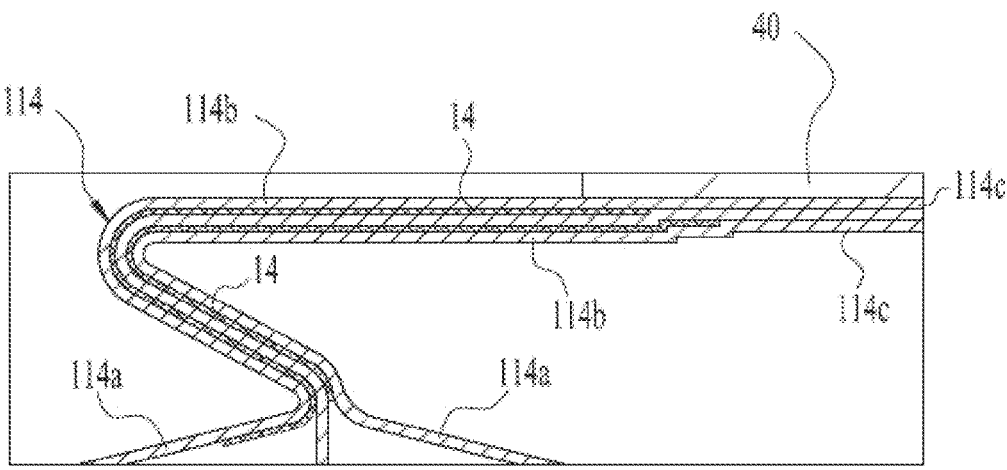
FIG. 12 is a schematic enlarged view of the battery cell shown in FIG. 11 at a square frame D.

FIG. 11 is a partial schematic cross-sectional view of a battery cell according to some embodiments of this application. FIG. 12 is a schematic enlarged view of the battery cell shown in FIG. 11 at a square frame D.

As shown in FIG. 11 and FIG. 12, in some embodiments, the first inactive substance portions 114 are electrically connected to the electrode terminal 30.

In some embodiments, the current collecting member 40 is configured to connect the electrode terminal 30 and the first inactive substance portions 114. Specifically, a region of the first inactive substance portion 114 that is not covered by the connection layer 14 and that is on a side of the connection layer 14 facing away from the first active substance portion 113 is used for welding to the current collecting member 40, that is, the third region 114c of the first inactive substance portion 114 is used for welding to the current collecting member 40.

In some embodiments, the third region 114c is located on a lower side of the current collecting member 40 and is attached to a lower surface of the current collecting member 40.

In some embodiments, the first inactive substance portion 114 is bent in a region covered by the connection layer 14. Specifically, the first inactive substance portion 114 is bent in the second region 114b. By bending the first inactive substance portions 114, a space occupied by the first inactive substance portions 114 can be reduced, so that energy density of the battery cell can be increased.

Second regions 114b of the plurality of first inactive substance portions 114 are connected via the connection layer 14. Therefore, in a process of bending the second regions 114b, the second regions 114b of the plurality of first inactive substance portions 114 are not prone to dislocation or bifurcation, thereby restraining deformation of the first region 114a, and reducing risks that the first region 114a is inserted into the first active substance portion 113 and the second active substance portion 123.

Figure 13:
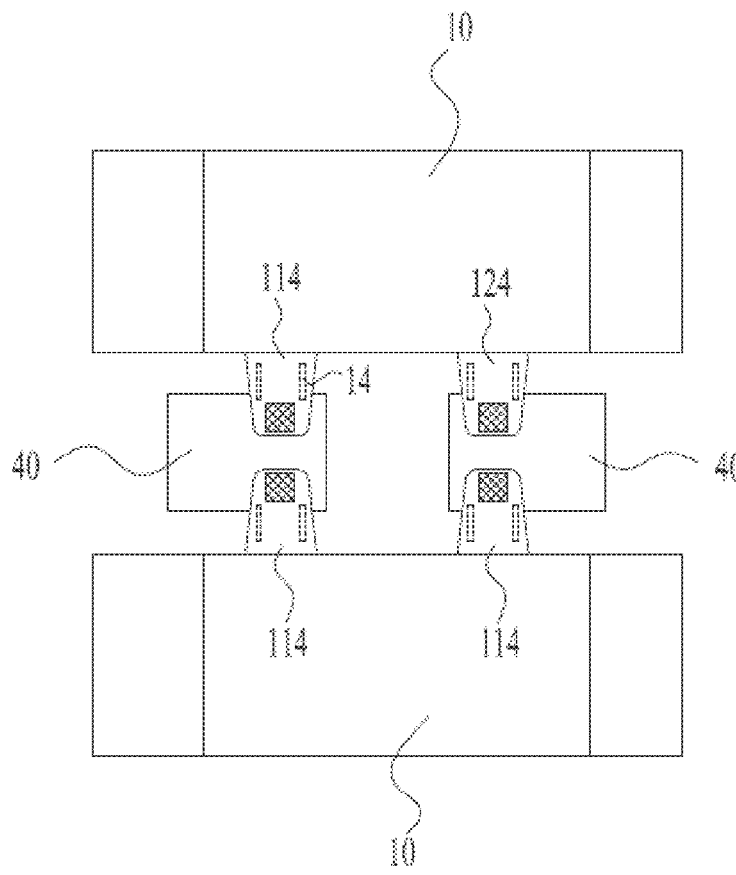
FIG. 13 is a schematic diagram of an electrode assembly and a current collecting member being in a welding process according to some embodiments of this application.

FIG. 13 is a schematic diagram of an electrode assembly and a current collecting member being in a welding process according to some embodiments of this application.

As shown in FIG. 13, during welding, the third regions 114c of the first inactive substance portions 114 are first attached to one current collecting member 40, and then the third regions 114c of the first inactive substance portions 114 are welded to the current collecting member 40. After the welding is completed, the first inactive substance portions 114 are bent in the second regions 114b, to turn a main body of the electrode assembly 10 over to a side of the current collecting member 40 in a thickness direction.

Although this application has been described with reference to preferred embodiments, various improvements may be made to this application without departing from the scope of this application and parts thereof may be replaced with equivalents. In particular, as long as no structural conflict exists, the technical features mentioned in the embodiments may be combined in any manner. This application is not limited to the specific embodiments disclosed herein, but includes all technical solutions falling within the scope of the claims.

The invention claimed is:

1. An electrode assembly, comprising a first electrode plate and a second electrode plate that have opposite polarities, wherein the first electrode plate and the second electrode plate are stacked;

the first electrode plate comprises a first active substance portion and a plurality of first inactive substance portions protruding from the first active substance portion, and the plurality of first inactive substance portions are stacked to form a stacked portion;

a connection layer is disposed between at least two adjacent first inactive substance portions in the stacked portion, and the connection layer is spaced from the first active substance portion in a first direction and connects two adjacent first inactive substance portions, wherein the first direction is a direction in which the first inactive substance portions protrude from the first active substance portion;

the second electrode plate comprises a second active substance portion and a plurality of second inactive substance portions protruding from the second active substance portion, and the plurality of second inactive substance portions are stacked;

the electrode assembly further comprises a separation structure between the first electrode plate and the second electrode plate, wherein the separation structure comprises a separation portion and a protruding portion directly protruding from the separation portion, and the separation portion separates the first active substance portion from the second active substance portion, the separation portion and the protruding portion of the separation structure each are made of a same material and each have through micropores; and an end part of the protruding portion of the separation structure facing away from the separation portion is located between two adjacent first inactive substance portions, and the connection layer fastens the end part to the first inactive substance portions, wherein the connection layer is colloid and is bonded directly to surfaces of the at least two adjacent first inactive substance portions in the stacked portion.

2. The electrode assembly according to claim 1, wherein the first inactive substance portion comprises a first region, a second region, and a third region that are consecutively disposed in the first direction, the second region is at least partially covered by the connection layer, neither of the first region and the third region is covered by the connection layer, and the second region is located on a side of the first region facing away from the first active substance portion.

3. The electrode assembly according to claim 1, wherein the connection layer is spaced from the first inactive substance portions along an edge in a second direction, and the second direction is perpendicular to the first direction.

4. The electrode assembly according to claim 1, wherein the connection layer is a hot melt adhesive and is bonded to surfaces of the first inactive substance portions.

5. The electrode assembly according to claim 1, wherein the connection layer is disposed between every two adjacent first inactive substance portions.

6. The electrode assembly according to claim 1, wherein a plurality of connection layers are disposed between adjacent first inactive substance portions, wherein the plurality of connection layers are spaced in a second direction, and the second direction is perpendicular to the first direction.

7. A battery cell, comprising:
a housing;

an electrode terminal disposed on the housing; and
at least one electrode assembly according to claim 1, accommodated in the housing, wherein the first inactive substance portions are electrically connected to the electrode terminal.

8. The battery cell according to claim 7, wherein the battery cell further comprises a current collecting structure to connect the electrode terminal and the first inactive substance portions; and
a region of the first inactive substance portion that is not covered by the connection layer and that is on a side of the connection layer facing away from the first active substance portion is used for welding to the current collecting structure.

9. The battery cell according to claim 8, wherein the first inactive substance portion is bent in a region covered by the connection layer.

10. A battery, comprising:
a box; and
at least one battery cell according to claim 7, wherein the battery cell is accommodated in the box.

11. An electric device, comprising the battery according to claim 10, wherein the battery is configured to provide electric energy.

12. The electrode assembly according to claim 1, wherein the connection layer directly fastens the end part to the first inactive substance portions.

* * * * *